(12) United States Patent
Lemire et al.

(10) Patent No.: US 10,018,372 B2
(45) Date of Patent: Jul. 10, 2018

(54) METHOD TO CONTROL A COMMUNICATION RATE BETWEEN A THERMOSTAT AND A CLOUD BASED SERVER

(71) Applicant: Honeywell International Inc., Morris Plains, NJ (US)

(72) Inventors: Patrick R. Lemire, La Prairie (CA); Robert D. Juntunen, Minnetonka, MN (US); Kurt Robideau, Zimmerman, MN (US)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 15/373,270

(22) Filed: Dec. 8, 2016

(65) Prior Publication Data

US 2017/0089602 A1    Mar. 30, 2017

Related U.S. Application Data

(63) Continuation of application No. 14/088,301, filed on Nov. 22, 2013, now abandoned.

(51) Int. Cl.

| | |
|---|---|
| *F24F 11/00* | (2018.01) |
| *G05B 15/02* | (2006.01) |
| *H04L 29/08* | (2006.01) |
| *H04W 4/02* | (2018.01) |
| *H04W 4/20* | (2018.01) |

(Continued)

(52) U.S. Cl.
CPC ............. *F24F 11/006* (2013.01); *F24F 11/30* (2018.01); *F24F 11/62* (2018.01); *G05B 15/02* (2013.01); *G05B 19/048* (2013.01); *H04L 67/10* (2013.01); *H04L 67/12* (2013.01); *H04W 4/023* (2013.01); *H04W 4/20* (2013.01); *F24F 11/46* (2018.01); *F24F 11/56* (2018.01); *F24F 11/63* (2018.01); *F24F 2011/0061* (2013.01); *F24F 2011/0068* (2013.01); *F24F 2011/0075* (2013.01); *G05B 2219/25011* (2013.01);

(Continued)

(58) Field of Classification Search
CPC ............. F24F 11/006; F24F 2011/0061; F24F 2011/0068; F24F 2011/0075; H04W 4/20; H04L 67/12; H04L 67/10; H04L 67/42; G05B 19/048; G05B 2219/2614; G05B 2219/25011
USPC ........................................................ 700/276
See application file for complete search history.

(56) References Cited

U.S. PATENT DOCUMENTS

| | | |
|---|---|---|
| 6,816,503 B1 | 11/2004 | Hashimoto et al. |
| 7,127,734 B1 | 10/2006 | Amit |

(Continued)

FOREIGN PATENT DOCUMENTS

| | | |
|---|---|---|
| CA | 2818546 A1 | 5/2012 |
| EP | 2051221 B1 | 1/2011 |

(Continued)

*Primary Examiner* — Thomas C Lee
*Assistant Examiner* — Alan Chu
(74) *Attorney, Agent, or Firm* — Seager Tufte & Wickhem LLP

(57) ABSTRACT

A communication rate between a cloud-based server and an HVAC controller located within a building may be controlled based on the amount of power available at the HVAC controller. The cloud-based server may notify a user if the amount of power available at the HVAC controller is determined to be low.

4 Claims, 9 Drawing Sheets

(51) Int. Cl.
*G05B 19/048* (2006.01)
*F24F 11/30* (2018.01)
*F24F 11/62* (2018.01)
*H04L 29/06* (2006.01)
*F24F 11/63* (2018.01)
*F24F 11/56* (2018.01)
*F24F 11/46* (2018.01)

(52) U.S. Cl.
CPC ............. *G05B 2219/2614* (2013.01); *G05B 2219/2642* (2013.01); *H04L 67/42* (2013.01)

(56) References Cited

U.S. PATENT DOCUMENTS

| | | |
|---|---|---|
| 7,130,719 B2 | 10/2006 | Ehlers et al. |
| 7,155,305 B2 | 12/2006 | Hayes et al. |
| 7,159,789 B2 | 1/2007 | Schwendinger et al. |
| 7,257,397 B2 | 8/2007 | Shamoon et al. |
| 7,308,617 B2 | 12/2007 | Artobello et al. |
| 7,451,017 B2 | 11/2008 | McNally |
| 7,457,973 B2 | 11/2008 | Liu |
| 7,480,907 B1 | 1/2009 | Marolia et al. |
| 7,510,126 B2 | 3/2009 | Rossi et al. |
| 7,668,532 B2 | 2/2010 | Shamoon et al. |
| 7,702,421 B2 | 4/2010 | Sullivan et al. |
| 7,746,242 B2 | 6/2010 | Schwendinger et al. |
| 7,949,615 B2 | 5/2011 | Ehlers et al. |
| 8,112,475 B2 | 2/2012 | Tran et al. |
| 8,127,158 B2 | 2/2012 | Jessup et al. |
| 8,255,090 B2 | 8/2012 | Frader-Thompson et al. |
| 8,332,055 B2 | 12/2012 | Veillette |
| 8,350,697 B2 | 1/2013 | Trundle et al. |
| 8,390,473 B2 | 3/2013 | Krzyzanowski et al. |
| 8,412,654 B2 | 4/2013 | Montalvo |
| 8,478,447 B2 | 7/2013 | Fadell et al. |
| 8,532,827 B2 | 9/2013 | Stefanski et al. |
| 8,560,128 B2 | 10/2013 | Ruff et al. |
| 8,571,518 B2 | 10/2013 | Imes et al. |
| 8,587,445 B2 | 11/2013 | Rockwell |
| 8,627,127 B2 | 1/2014 | Mucignat et al. |
| 8,634,788 B2 | 1/2014 | Wright et al. |
| 8,850,348 B2 | 9/2014 | Fadell et al. |
| 8,949,051 B2 | 2/2015 | Burke et al. |
| 9,026,254 B2 | 5/2015 | Warren et al. |
| 9,026,261 B2 | 5/2015 | Bukhin et al. |
| 9,046,898 B2 | 6/2015 | Mucignat et al. |
| 9,122,283 B2 | 9/2015 | Rylski et al. |
| 9,357,024 B2 | 5/2016 | Salazar et al. |
| 9,357,152 B2 | 5/2016 | Griffin |
| 9,445,305 B2 | 9/2016 | Lyon et al. |
| 9,477,241 B2 | 10/2016 | Schultz et al. |
| 9,483,064 B2 | 11/2016 | McPherson |
| 9,488,994 B2 | 11/2016 | Zywicki et al. |
| 2002/0147006 A1 | 10/2002 | Coon et al. |
| 2005/0172056 A1 | 8/2005 | Ahn |
| 2006/0017581 A1* | 1/2006 | Schwendinger ..... G01R 31/3689 340/636.1 |
| 2006/0063522 A1 | 3/2006 | McFarland |
| 2006/0097063 A1 | 5/2006 | Zeevi |
| 2007/0037605 A1 | 2/2007 | Logan et al. |
| 2007/0249319 A1 | 10/2007 | Faulkner et al. |
| 2008/0014852 A1 | 1/2008 | Mielke et al. |
| 2010/0034386 A1 | 2/2010 | Choong et al. |
| 2010/0261465 A1 | 10/2010 | Rhoads et al. |
| 2010/0295530 A1* | 11/2010 | Ikenaga ................ H02M 3/157 323/318 |
| 2012/0179300 A1* | 7/2012 | Warren ................ F24F 11/0012 700/278 |
| 2012/0259476 A1 | 10/2012 | Trieb et al. |
| 2012/0267089 A1* | 10/2012 | Mucignat ........... G05D 23/1905 165/201 |
| 2013/0279410 A1 | 10/2013 | Dublin, III et al. |
| 2014/0312127 A1* | 10/2014 | Rylski ................ G05D 23/1905 236/51 |
| 2015/0066216 A1* | 3/2015 | Ramachandran .... F24F 11/0086 700/276 |
| 2015/0148965 A1 | 5/2015 | Lemire et al. |

FOREIGN PATENT DOCUMENTS

| | | |
|---|---|---|
| JP | 2011202942 A | 10/2011 |
| WO | 2009034720 A1 | 3/2009 |
| WO | 2009067251 A1 | 5/2009 |
| WO | 2013058820 A1 | 4/2013 |
| WO | 201310179 A1 | 7/2013 |

* cited by examiner

METHOD TO CONTROL A COMMUNICATION RATE BETWEEN A THERMOSTAT AND A CLOUD BASED SERVER

This is a continuation application of co-pending U.S. patent application Ser. No. 14/088,301, filed Nov. 22, 2013, and entitled "METHOD TO CONTROL A COMMUNICATION RATE BETWEEN A THERMOSTAT AND A CLOUD BASED SERVER", which is incorporated herein by reference.

TECHNICAL FIELD

The present disclosure relates generally to HVAC systems, and more particularly to HVAC controllers that accommodate and/or facilitate control of an HVAC system from a remote location.

BACKGROUND

Heating, ventilation, and/or air conditioning (HVAC) systems are often used to control the comfort level within a building or other structure. Such HVAC systems typically include an HVAC controller that controls various HVAC components of the HVAC system in order to control one or more environmental conditions within the building. In some cases, it may be desirable for a user to be able to affect the operation of an HVAC system from a remote location. In such cases, communication between a user's remote device and the HVAC controller located within a building may be routed through a web server or the like to which both the user's remote device and the HVAC controller are connected. What would be desirable are methods and systems for improving the reliability and/or user experience of such a system, particularly when the HVAC controller is powered by a local power source such as a battery.

SUMMARY

The present disclosure relates generally to building controllers, and more particularly to building controllers that accommodate and/or facilitate control of a building control system from a remote location. In an illustrative embodiment, a building controller can include: an input/output block configured to send one or more control signals to control one or more building components; a communications port configured to send and/or receive messages via a communications network; an energy storage device for powering at least part of the building controller; and a controller operatively coupled to the input/output block, the communications port, and the energy storage device. The controller can be configured to determine an available amount of power stored in the energy storage device and to communicate, via the communications port, a message that is indicative of a delay until a subsequent communication time, wherein the delay is dependent upon the determined available amount of power stored in the energy storage device. In some cases, the delay may be increased as the amount of power stored in the energy storage device drops. This may help extend the operational life of the building controller in controlling the one or more building components of the building by reducing the power that is used to communicate over the communications network.

In some cases, a server or the like may be in communication with the building controller, and may receive the message that is indicative of the delay until the subsequent communication time. When so provided, the server may not have to assume from a lack of communication from the building controller that some other failure has occurred. When the user attempts to interact with the building controller, the server may send a message to a user's remote computing device (computer, tablet, smart phone, etc.) indicating that the building controller is in a lower power state, and as such may not receive requests entered via the user's remote computing device until the next available communication time.

The preceding summary is provided to facilitate an understanding of some of the innovative features unique to the present disclosure and is not intended to be a full description. A full appreciation of the disclosure can be gained by taking the entire specification, claims, drawings, and abstract as a whole.

BRIEF DESCRIPTION OF THE DRAWINGS

The disclosure may be more completely understood in consideration of the following description of various illustrative embodiments in connection with the accompanying drawings, in which.

Figure 1:
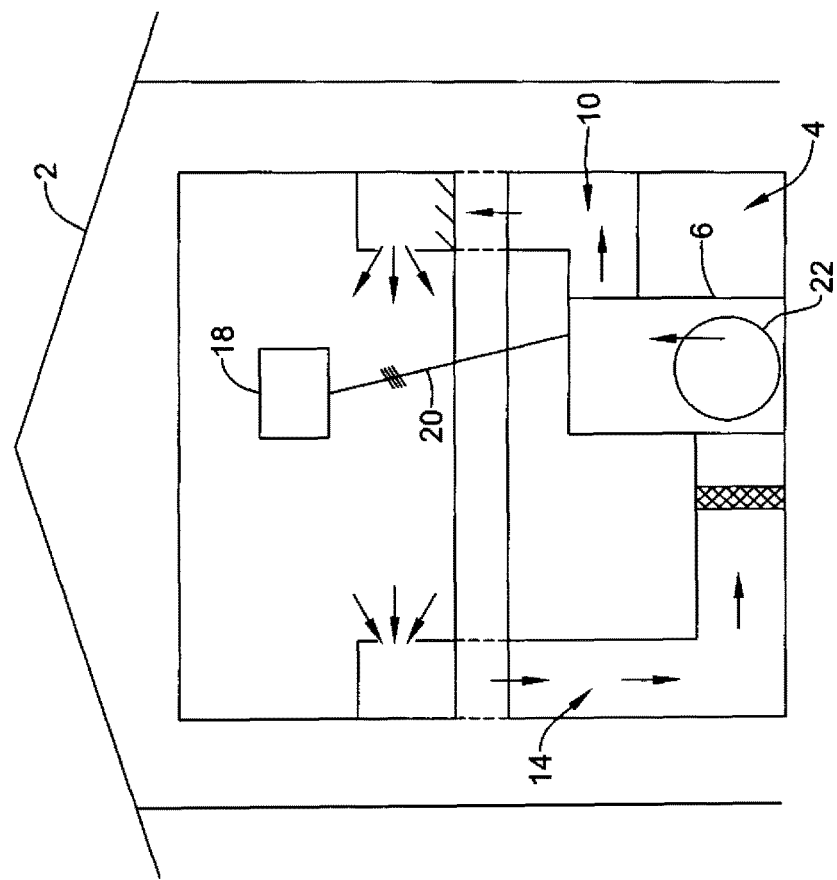
FIG. 1 is a schematic view of an illustrative HVAC system servicing a building or structure.

While the disclosure is amenable to various modifications and alternative forms, specifics thereof have been shown by way of example in the drawings and will be described in detail. It should be understood, however, that the intention is not to limit aspects of the disclosure to the particular illustrative embodiments described. On the contrary, the intention is to cover all modifications, equivalents, and alternatives falling within the spirit and scope of the disclosure.

DESCRIPTION

The following description should be read with reference to the drawings wherein like reference numerals indicate like elements throughout the several views. The description and drawings show several embodiments which are meant to illustrative in nature.

While an HVAC system is used as an example below, it is contemplated that the present disclosure is applicable to any building control system such as a lighting system, a security system, a fire system, a home automation system, and/or any other building control system, as desired.

FIG. 1 is a schematic view of a building 2 having an illustrative heating, ventilation, and air conditioning (HVAC) system 4. While FIG. 1 shows a typical forced air type HVAC system, other types of HVAC systems are contemplated including, but not limited to, boiler systems, radiant heating systems, electric heating systems, cooling systems, heat pump systems, and/or any other suitable type of HVAC system, as desired. The illustrative HVAC system 4 of FIG. 1 includes one or more HVAC components 6, a system of ductwork and air vents including a supply air duct 10 and a return air duct 14, and one or more HVAC controllers 18. The one or more HVAC components 6 may include, but are not limited to, a furnace, a heat pump, an electric heat pump, a geothermal heat pump, an electric heating unit, a backup heating unit, an air conditioning unit, a humidifier, a dehumidifier, an air exchanger, an air cleaner, a damper, a valve, and/or the like.

It is contemplated that the HVAC controller(s) 18 may be configured to control the comfort level in the building or structure by activating and deactivating the HVAC component(s) 6 in a controlled manner. The HVAC controller(s) 18 may be configured to control the HVAC component(s) 6 via a wired or wireless communication link 20. In some cases, the HVAC controller(s) 18 may be a thermostat, such as, for example, a wall mountable thermostat, but this is not required in all embodiments. Such a thermostat may include (e.g. within the thermostat housing) or have access to a temperature sensor for sensing an ambient temperature at or near the thermostat. In some instances, the HVAC controller(s) 18 may be a zone controller, or may include multiple zone controllers each monitoring and/or controlling the comfort level within a particular zone in the building or other structure. In some cases, the HVAC controller(s) 18 may be configured to communicate with one or more remote devices including a remote server and/or a user's mobile wireless device over a network.

In the illustrative HVAC system 4 shown in FIG. 1, the HVAC component(s) 6 may provide heated air (and/or cooled air) via the ductwork throughout the building 2. As illustrated, the HVAC component(s) 6 may be in fluid communication with every room and/or zone in the building 2 via the ductwork 10 and 14, but this is not required. In operation, when a heat call signal is provided by the HVAC controller(s) 18, an HVAC component 6 (e.g. forced warm air furnace) may be activated to supply heated air to one or more rooms and/or zones within the building 2 via supply air ducts 10. The heated air may be forced through supply air duct 10 by a blower or fan 22. In this example, the cooler air from each zone may be returned to the HVAC component 6 (e.g. forced warm air furnace) for heating via return air ducts 14. Similarly, when a cool call signal is provided by the HVAC controller(s) 18, an HVAC component 6 (e.g. air conditioning unit) may be activated to supply cooled air to one or more rooms and/or zones within the building or other structure via supply air ducts 10. The cooled air may be forced through supply air duct 10 by the blower or fan 22. In this example, the warmer air from each zone may be returned to the HVAC component 6 (e.g. air conditioning unit) for cooling via return air ducts 14.

Figure 2:
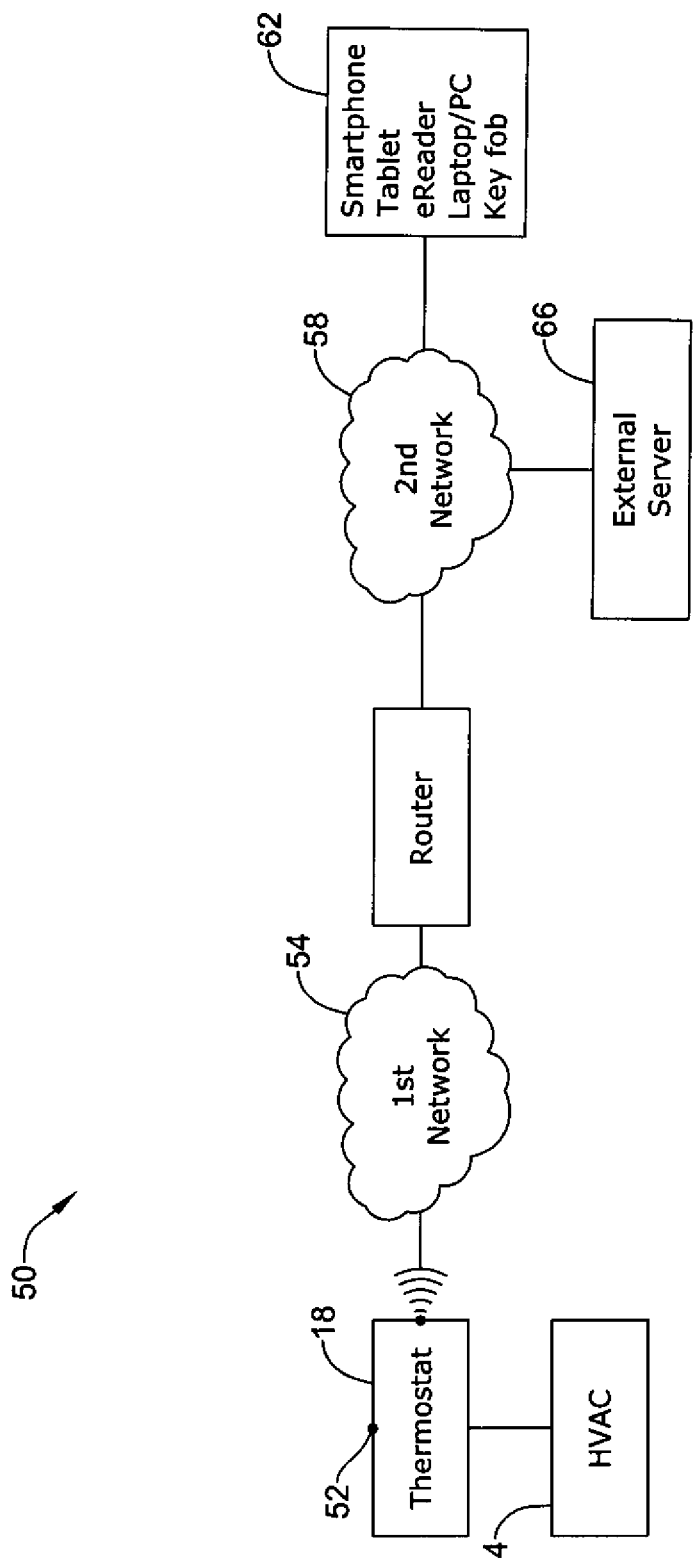
FIG. 2 is a schematic view of an illustrative HVAC control system that may facilitate access and/or control of the HVAC system of FIG. 1.

FIG. 2 is a schematic view of an HVAC control system 50 that facilitates remote access and/or control of the HVAC system 4 shown in FIG. 1. The illustrative HVAC control system 50 includes an HVAC controller, as for example, HVAC controller 18 (see FIG. 1) that is configured to communicate with and control one or more HVAC components 6 of the HVAC system 4. As discussed above, the HVAC controller 18 may communicate with the one or more HVAC components 6 of the HVAC system 4 via a wired or wireless link. Additionally, the HVAC controller 18 may be adapted to communicate over one or more wired or wireless networks that may accommodate remote access and/or control of the HVAC controller 18 via another device such as a smart phone, tablet, e-reader, laptop computer, personal computer, or the like. As shown in FIG. 2, the HVAC controller 18 may include at least one communications port 52 for communicating over a first network 54 and/or over a second network 58. In some cases, the first network 54 may be a wireless local area network (LAN), and the second network 58 (when provided) may be a wide area network or global network (WAN) including, for example, the Internet. In some cases, the wireless local area network 54 may include a router that provide a wireless access point and/or a network host device that is separate from the HVAC controller 18. In other cases, the wireless local area network 54 may provide a wireless access point and/or a network host device that is part of the HVAC controller 18. In some cases, the wireless local area network 54 may include a local domain name server (DNS), but this is not required for all embodiments. In some cases, the wireless local area network 54 may be an ad-hoc wireless network, but this is not required.

In some cases, the HVAC controller 18 may be programmed to communicate over the second network 58 with an external web service hosted by one or more external web servers 66. A non-limiting example of such an external web service is Honeywell's TOTAL CONNECT™ web service. The HVAC controller 18 may be configured to upload selected data via the second network 58 to the external web service where it may be collected and stored on the external web server 66. In some cases, the data may be indicative of the performance of the HVAC system 4. Additionally, the HVAC controller 18 may be configured to receive and/or download selected data, settings and/or services including software updates from the external web service over the second network 58. The data, settings and/or services may be received automatically from the web service, downloaded periodically in accordance with a control algorithm, and/or downloaded in response to a user request. In some cases, for example, the HVAC controller 18 may be configured to receive and/or download an HVAC operating schedule and operating parameter settings such as, for example, temperature setpoints, humidity set points, start times, end times, schedules, window frost protection settings, and/or the like from the web server 66 over the second network 58. In some instances, the HVAC controller 18 may be configured to receive one or more user profiles having at least one operational parameter setting that is selected by and reflective of a user's preferences. In still other instances, the HVAC controller 18 may be configured to receive and/or download firmware and/or hardware updates such as, for example, device drivers from the web server 66 over the second network 58. Additionally, the HVAC controller 18 may be configured to receive local weather data, weather alerts and/or warnings, major stock index ticker data, and/or news headlines over the second network 58. These are just some examples.

Depending upon the application and/or where the HVAC user is located, remote access and/or control of the HVAC controller 18 may be provided over the first network 54 and/or the second network 58. A variety of remote, wireless devices 62 may be used to access and/or control the HVAC controller 18 from a remote location (e.g. remote from the HVAC Controller 18) over the first network 54 and/or second network 58 including, but not limited to, mobile phones including smart phones, tablet computers, laptop or personal computers, e-readers, and/or the like. In many cases, the remote, wireless devices 62 are configured to communicate wirelessly over the first network 54 and/or second network 58 with the HVAC controller 18 via one or more wireless communication protocols including, but not limited to, cellular communication, ZigBee, REDLINK™, Bluetooth, WiFi, IrDA, dedicated short range communication (DSRC), EnOcean, and/or any other suitable common or proprietary wireless protocol, as desired.

In some cases, an application program code (i.e. app) stored in the memory of the remote device 62 may be used to remotely access and/or control the HVAC controller 18. The application program code (app) may be provided for downloading from the external web service hosted by the external web server 66 (e.g. Honeywell's TOTAL CONNECT™ web service) to which the HVAC controller 18 may also be connected or another external web service (e.g. ITUNES® or Google Play). In some cases, the app may provide a remote user interface for interacting with the HVAC controller 18 at the user's remote device 62. For example, through the user interface provided by the app, a user may be able to change the operating schedule and operating parameter settings such as, for example, temperature setpoints, humidity set points, start times, end times, schedules, window frost protection settings, accept software updates and/or the like. Communications may be routed from the user's remote device 62 to the web server 66 and then, from the web server 66 to the HVAC controller 18. In some cases, communications may flow in the opposite direction such as, for example, when a user interacts directly with the HVAC controller 18 to change an operating parameter setting such as, for example, a schedule change or a set point change. The change made at the HVAC controller 18 may then be routed to the web server 66 and then from the web server 66 to the remote device 62 where it may reflected by the application program executed by the remote device 62. In other cases, a user may be able to interact with the HVAC controller 18 via a user interface provided by one or more web pages served up by the web server 66. The user may interact with the one or more web pages using a variety of internet capable devices to effect a change at the HVAC controller 18 as well as view usage data and energy consumption date related to the usage of the HVAC system 4. In still yet another case, communication may occur between the user's remote device 62 and the HVAC controller 18 without being relayed through a server. These are just some examples.

In some cases, the HVAC controller 18 may be programmed to periodically poll the external web server 66 via the second network 58. The rate at which the HVAC controller 18 polls the external web server 66 may control the overall communication rate between the HVAC controller 18, the web server 66, and a user's remote device 62. For example, in many cases, the web server 66 may be programmed to respond to the HVAC controller 18 only when it is polled by the HVAC controller 18 over a network such as second network 58. Until that time, the web server 66 may be programmed to buffer any data to be sent to the HVAC controller 18 such as, for example, a set point change or a schedule change. Upon receiving a poll from the HVAC controller 18 via the second network 58, the web server 66 may be programmed to deliver the data in a rapid communication burst to the HVAC controller. In general, the more rapid the polling rate, the more rapidly a response may be received from the web server 66. Because the HVAC controller 18 may be programmed to first poll the web server 66 before it may receive any data from the server 66 such as, for example, a set point change which the user may have effected through an app provided on their remote device 62, the polling rate may be the underlying factor driving the communication rate between a user's remote device 62, the web server 66, and the HVAC controller 18. The amount of time that passes from when the user interacts with the HVAC controller 18 via their remote device 62 (e.g. the user changes a temperature set point), the interaction is delivered to the HVAC controller 18 from the user's remote device 62 via the web server 66, and when the user actually experiences the change at the HVAC controller 18 may be referred to as message latency. User satisfaction and usability may be associated with the message latency between the HVAC controller 18, the web server 66 and the user's remote device 62. In some cases, message latency may also be experienced when the user is interacting with the HVAC controller 18 at the user interface provided at the HVAC controller 18. Thus, a faster polling rate may be expected to produce lower message latencies which may be desirable when the user is located in close proximity to the HVAC controller 18 because the user may observe the effect of their interaction with a minimal amount of waiting time. If the message latency is too slow, the user may be concerned that communication between the web server 66, the HVAC controller 18 and/or the user's remote device has been disrupted. Because a faster polling rate may utilize a greater amount of energy, in some cases, the polling rate may be dependent upon the amount of available energy at the HVAC controller 18.

In other cases, the web server 66 may be configured to periodically poll the HVAC controller 18. In some cases, HVAC controller 18 may be programmed to response to the web server 66 only when it is polled by the web server 66 over a network such as second network 58. Until that time, the HVAC controller 18 may be programmed to buffer any data to be sent to the web server 66 such as, for example, a set point change or a schedule change made at the HVAC controller 18, a current temperature reading, or an indication of a user's proximity to the HVAC controller 18. Upon receiving a poll from the web server 66 via the second network 58, the HVAC controller 18 may be programmed to deliver the data in a rapid communication burst to the web server 66. As discussed herein, the rate at which the HVAC controller 18 is polled by the external web server 66 may affect the message latency between the HVAC controller 18, the web server 66, and a user's remote device 62. A faster polling rate may be expected to produce lower message latencies. In addition, if the message latency is too slow, the user may be concerned that communication between the web server 66, the HVAC controller 18 and/or the user's remote device has been disrupted.

Figure 3:
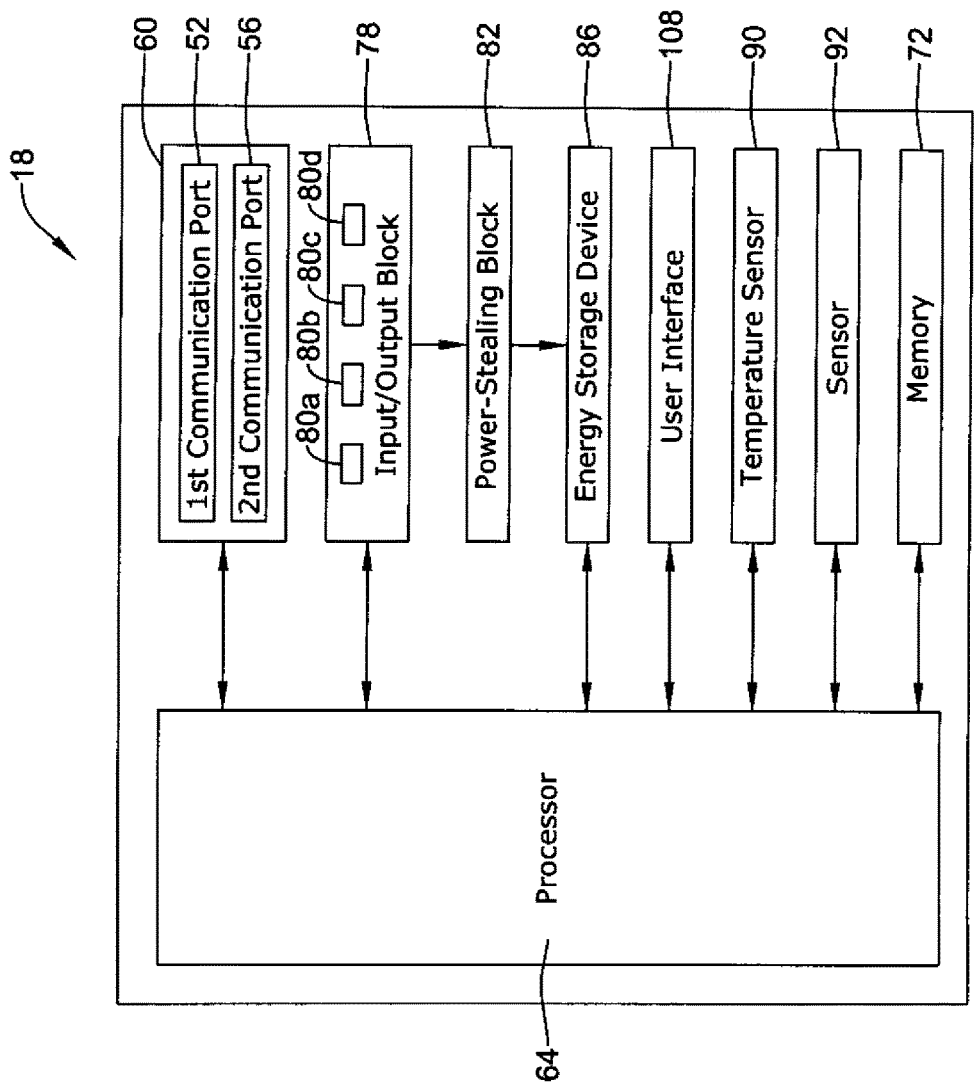
FIG. 3 is a schematic block diagram of an illustrative HVAC controller.

FIG. 3 is a schematic block diagram of the illustrative HVAC controller 18 shown in FIG. 2. As discussed above with reference to FIG. 2, the HVAC controller 18 may be accessed and/or controlled from a remote location over the first network 54 and/or the second network 58 using a remote wireless device 62 such as, for example, a smart phone, a tablet computer, a laptop or personal computer, an e-reader, and/or the like. In some instances, the HVAC controller 18 may be a thermostat, but this is not required. As shown in FIG. 3, the HVAC controller 18 may include a communications block 60 having a first communications port 52 for communicating over a first network (e.g. wireless LAN) and a second communications port 56 for communicating over a second network (e.g. WAN or the Internet). The first communications port 52 can be a wireless communications port including a wireless transceiver for wirelessly sending and/or receiving signals over a first wireless network 54. Similarly, the second communications port 56 may be a wireless communications port including a wireless transceiver for sending and/or receiving signals over a second wireless network 58. In some cases, the second communications port 56 may be in communication with a wired or wireless router or gateway for connecting to the second network, but this is not required. In some cases, the router or gateway may be integral to the HVAC controller 18 or may be provided as a separate device.

The illustrative HVAC controller 18 may include a processor (e.g. microprocessor, microcontroller, etc.) 64 and a memory 72. The HVAC controller 18 may also include a user interface 108, but this is not required. In some cases, HVAC controller 18 may include a timer (not shown). The timer may be integral to the processor 64 or may be provided as a separate component. The memory 72 of the illustrative HVAC controller 18 may be in communication with the processor 64. The memory 72 may be used to store any desired information, such as the aforementioned control algorithm, set points, schedule times, diagnostic limits such as, for example, differential pressure limits, delta T limits, and the like. The memory 72 may be any suitable type of storage device including, but not limited to, RAM, ROM, EPROM, flash memory, a hard drive, and/or the like. In some cases, the processor 64 may store information within the memory 72, and may subsequently retrieve the stored information from the memory 72.

The HVAC controller 18 may also optionally include an input/output block (I/O block) 78 for receiving one or more signals from the HVAC system 4 and/or for providing one or more control signals to the HVAC system 4. For example, the I/O block 78 may communicate with one or more HVAC components 6 of the HVAC system 4. Alternatively, or in addition, the I/O block 78 may communicate with another controller, which is in communication with one or more HVAC components of the HVAC system 4, such as a zone control panel in a zoned HVAC system, equipment interface module (EIM) (e.g. EIM 34 shown in FIG. 1) or any other suitable building control device.

In some cases, an optional power-stealing block 82 may be connected to one or more wires of the I/O block 78, and may be configured to steal power from the one or more wires of the I/O block 78. The power stolen from the one or more wires of the I/O block may be stored in an energy storage device 86, which may be used to at least partially power the HVAC controller 18. In some cases, the energy storage device 86 may be capacitor or a rechargeable battery. In some instances, the energy storage device may include a non-rechargeable battery. In some cases, the HVAC controller 18 may include a back-up source of energy such as, for example, a battery that may be used to supplement power supplied to the HVAC controller 18 when the amount of available power stored by the energy storage device 86 is less than optimal or is insufficient to power certain applications. Certain applications or functions performed by the HVAC controller may require a greater amount of energy than others. If there is an insufficient amount of energy stored in the energy storage device 86, then, in some cases, certain applications and/or functions may be prohibited by the processor 64.

The HVAC controller 18 may include one or more sensors such as for example, a temperature sensor, a humidity sensor, an occupancy sensor, a proximity sensor, and/or the like. In some cases, the HVAC controller 18 may include an internal temperature sensor 90, as shown FIG. 3, but this is not required. The HVAC controller 18 may communicate with one or more remote temperature sensors, humidity sensors, and/or occupancy sensors located throughout the building or structure. Additionally, the HVAC controller may communicate with a temperature sensor and/or humidity sensor located outside of the building or structure for sensing an outdoor temperature and/or humidity if desired.

In some cases, the HVAC controller 18 may include a sensor 92 that is configured determine if a user is in proximity to the building controller. In some cases, the sensor 92 may be a motion sensor or a proximity sensor such as, for example, a passive infrared (PIR) sensor. In certain cases in which the sensor 92 is a motion sensor or a proximity sensor, the sensor 92 may be located remotely from the HVAC controller 18 and may be in wireless communication with the HVAC controller 18 via one of the communication ports.

In other cases, the sensor 92 may be configured to determine that the user is near or expected to be near the HVAC controller 18 based, at least in part, on the location data provided by a location based service application program executed by a user's remote device 62 that the user utilizes to interact with the HVAC controller 18 from a remote location. The location data generated by the location based services app may be transmitted from the user's remote device 62 directly to the HVAC controller 18 or, in some cases, may be transmitted to the HVAC controller 18 via a server 66 (e.g. Honeywell's TOTAL CONNECT™ server) to which both the HVAC controller 18 and the user's remote device 62 may be connected. In some cases, the sensor 92 may be configured to determine that the user or, more specifically, the user's remote device 62 has crossed a proximity boundary relative to the location of the HVAC controller 18 based on location data provided by the user's remote device that the user utilizes to interact with the HVAC controller 18. The sensor 92 may determine that the user has crossed a proximity boundary by comparing the location data generated by the user's remote device 62 to a predetermined fix location. In some cases, the proximity boundary may be defined by a radius extending outward from the predetermined fix location, and the predetermined fixed location may be the location of the HVAC controller 18.

In yet another example, the sensor 92 may be configured to determine that the user is in proximity to or is expected to be in proximity to the HVAC controller 18 upon detecting that the user's remote device 62 is connected to the building's wireless network which, in some cases, may be the same network to which the HVAC controller 18 is also connected. Such functionality is shown and described in U.S. application Ser. No. 13/559,443 entitled "HVAC CONTROLLER WITH WIRELESS NETWORK BASED OCCUPANCY DETECTION AND CONTROL", the entirety of which is incorporated by reference herein for all purposes.

In still other cases, the sensor 92 may be configured to determine that a user is in proximity to the HVAC controller 18 upon sensing a user's interaction with the HVAC controller 18 via the user interface provided at the HVAC controller 18. For example, the sensor 92 may be configured to sense when the screen of the user interface 108 is touched and/or when a button provided at the user interface 108 is pressed by a user. In some cases, the button may be a touch sensitive region provided on the user interface 108 when the user interface 108 incorporates a touch screen display. In other cases, the button may be a hard button or soft key that is provided separate from a display of the user interface 108.

In some cases, upon detecting or determining that a user is in proximity to the HVAC controller, the sensor 92 may deliver a signal to the processor 64 indicating that the user is in proximity to the HVAC controller 18. In other cases, upon detecting or determining that a user is in proximity to the HVAC controller, the sensor 92 may be configured to transmit a signal to a remote server 66 over a second network 58 via the communications block 60.

The user interface 108, when provided, may be any suitable user interface that permits the HVAC controller 18 to display and/or solicit information, as well as accept one or more user interactions with the HVAC controller 18. For example, the user interface 108 may permit a user to locally enter data such as temperature set points, humidity set points, starting times, ending times, schedule times, diagnostic limits, responses to alerts, and the like. In one embodiment, the user interface 108 may be a physical user interface that is accessible at the HVAC controller 18, and may include a display and/or a distinct keypad. The display may be any suitable display. In some instances, a display may include or may be a liquid crystal display (LCD), and in some cases a fixed segment display or a dot matrix LCD display. In other cases, the user interface 108 may be a touch screen LCD panel that functions as both display and keypad. The touch screen LCD panel may be adapted to solicit values for a number of operating parameters and/or to receive such values, but this is not required. In still other cases, the user interface 108 may be a dynamic graphical user interface.

In some instances, the user interface 108 need not be physically accessible to a user at the HVAC controller 18. Instead, the user interface 108 may be a virtual user interface 108 that is accessible via the first network 54 and/or second network 58 using a mobile wireless device such as one of those remote devices 62 previously described herein. In some cases, the virtual user interface 108 may be provided by an app exacted by a user's remote device for the purposes of remotely interacting with the HVAC controller 18. Through the virtual user interface 108 provided by the app on the user's remote device 62, the user may make changes to temperature set points, humidity set points, starting times, ending times, schedule times, diagnostic limits, respond to alerts, update their user profile, view energy usage data, and/or the like. In some instances, changes made by a user to the HVAC controller 18 via a user interface 108 provided by an app on the user's remote device 62 may be first transmitted to an external web server 66. The external web server 66 may receive and accept any user inputs entered via the virtual user interface 108 provided by the app on the user's remote device 62, and associate the user inputs with a user's account on the external web service. If the user inputs include changes to the existing control algorithm including any temperature set point changes, humidity set point changes, schedule changes, start and end time changes, window frost protection setting changes, operating mode changes, and/or changes to a user's profile, the external web server 66 may update the control algorithm, as applicable, and transmit at least a portion of the updated control algorithm over the second network 58 to the HVAC controller 18 where it is received via the second communications port 56 and may be stored in the memory 72 for execution by the processor 64. In some cases, the user may observe the effect of their inputs at user interface 108 of the HVAC controller 18.

As discussed herein, the communication rate between the processor 64 and the web server 66 may affect the message latency from when the user interacts with the user interface of their remote device 62 to effect a change at the HVAC controller 18 and when a message corresponding to the user's interaction with the remote device 62 is communicated to the HVAC controller 18. The HVAC controller 18 may be configured such that the user experiences lower message latencies when the HVAC controller 18 has a full amount of available power stored in the energy storage device 86. The message latency may increase as less power is available to the HVAC controller 18 from the energy storage device 86.

In some instances, a virtual user interface of the HVAC controller 18 may include one or more web pages that are broadcasted over the second network 58 (e.g. WAN or the Internet) by an external web server (e.g. web server 66). The one or more web pages forming the virtual user interface 108 may be hosted by an external web service and may be associated with a user account having one or more user profiles. The external web server 66 may receive and accept user inputs entered via a virtual user interface (e.g. the user interface of the remote device 62), and associate the user input with a user's account on the external web service. If the user inputs include changes to the existing control algorithm including temperature set point changes, humidity set point changes, schedule changes, start and end time changes, window frost protection setting changes, operating mode changes, and/or changes to a user's profile, the external web server 66 may update the control algorithm, as applicable, and transmit at least a portion of the updated control algorithm over the second network 58 to the HVAC controller 18 where it is received via the second communications port 56 and may be stored in the memory 72 for execution by the processor 64. In some cases, the user may observe the effect of their inputs entered via the virtual user interface (e.g. the user interface of the remote device 62). Rather than using web pages, it is contemplated that the virtual user interface may be provided by an application program (app) that is running on a remote device 62. The application program may exchange information with the web server 66.

In some cases, a user may utilize the local user interface 108 of the HVAC controller 18 (if provided) and/or a virtual user interface 108 of a remote device as described herein for interacting with the HVAC controller 18. In some cases, the virtual user interface 108 may provide more advanced capabilities to the user than the local user interface of the HVAC controller 18.

Figure 4:
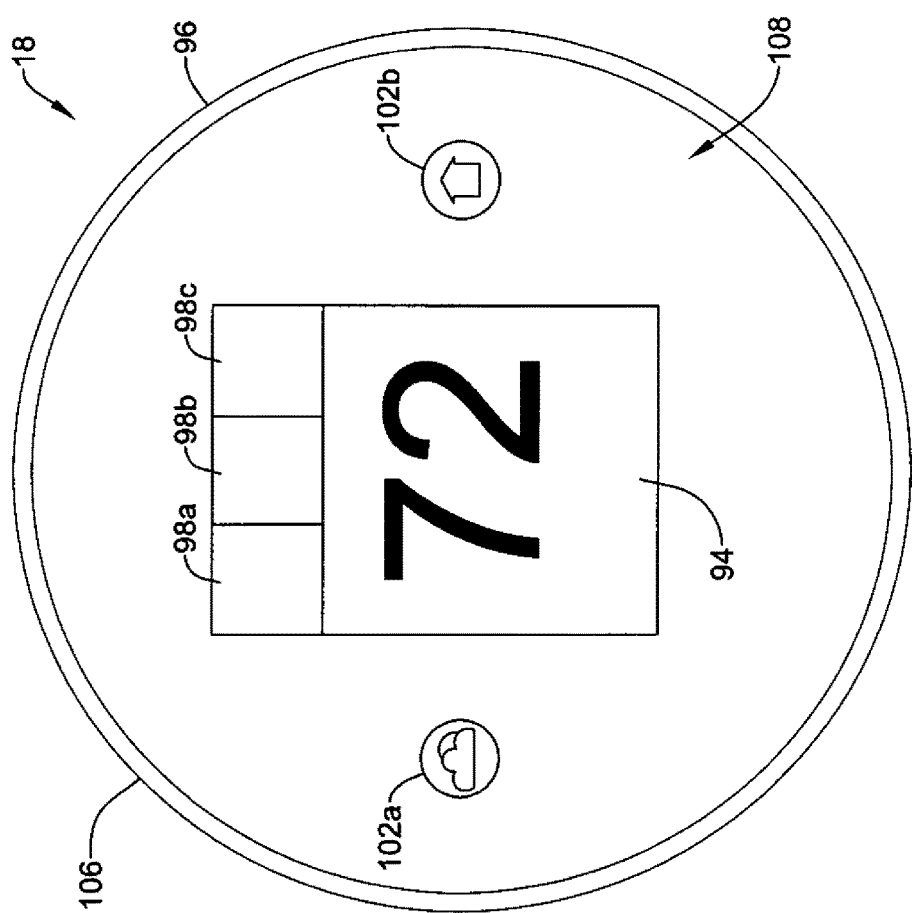
FIG. 4 is a front, schematic view of an illustrative HVAC controller.

FIG. 4 is a front view of an illustrative HVAC controller 18 including a local user interface 108 located at the HVAC controller 18. The local user interface 108 provided at the HVAC controller 18 may be in addition to, or in the alternative to, a virtual user interface that may be provided by an application program executed by a user's remote device 62 and/or that may be viewed as one or more web pages served up by a web server 66, as discussed herein. As shown in FIG. 4, the local user interface 108 may include a display 94 disposed within a housing 96. In some cases, the display 94 may be a touch screen display. The user interface 108 may include one or more touch sensitive regions 98a-98c provided on the display 94, each touch sensitive region defining a button through which the user may interact with the HVAC controller 18. Alternatively, or in addition, the local user interface 108 may include one or more buttons 102a and 102b that may be provided separate from the display 94 through which the user may interact with the HVAC controller 18. In some cases, the buttons 102a, 102b may be touch sensitive capacitive buttons. In other cases, the buttons 102a, 102b may be hard, physical buttons or soft keys. It will be generally understood that the size and shape of the display as well as the number and location of the various buttons can vary.

The housing 96 may be fabricated from any suitable material. As shown in FIG. 4, the housing 96 may have a cylindrical shape with a generally circular foot print, but this is not required. In some cases, the housing 96 may be a two-part housing and may include a rotating ring 106 which may form part of the user interface 108, and which may provide another mechanism for accepting an input from a user. For example, the user may rotate the ring 106 to increase or decrease an operating parameter set point or to change information viewed on the display 94 by advancing from a first screen to a second screen displayed on the display 94. In some cases, while the local user interface 108 that is provided at the HVAC controller 18 is capable of receiving user interactions, a more advanced or detailed user interface 108 for more fully interacting with the HVAC controller 18 may be provided by an application program executed at a user's remote device 62 and/or by one or more web pages served up by a web server such as web server 66, as described herein.

Referring back to FIG. 3, the processor 64 may be programmed to operate in accordance with an algorithm that controls or at least partially controls one or more HVAC components of an HVAC system such as, for example, HVAC system 4 shown in FIG. 1. The processor 64, for example, may operate in accordance with a control algorithm that provides temperature set point changes, humidity set point changes, schedule changes, start and end time changes, window frost protection setting changes, operating mode changes, and/or the like. At least a portion of the control algorithm may be stored locally in the memory 72 of the HVAC controller 18 and, in some cases, may be received from an external web service over the second network. The control algorithm (or portion thereof) stored locally in the memory 72 of the HVAC controller 18 may be periodically updated in accordance with a predetermined schedule (e.g. once every 24 hours, 48 hours, 72 hours, weekly, monthly, etc.), updated in response to any changes to the control algorithm made by a user, and/or updated in response to a user's request. The updates to the control algorithm or portion of the control algorithm stored in the memory 72 may be received from an external web service over the second network. In some cases, the control algorithm may include settings such as set points.

In some cases, the processor 64 may operate according to a first operating mode having a first temperature set point, a second operating mode having a second temperature set point, a third operating mode having a third temperature set point, and/or the like. In some cases, the first operating mode may correspond to an occupied mode and the second operating mode may correspond to an unoccupied mode. In some cases, the third operating mode may correspond to a holiday or vacation mode wherein the building or structure in which the HVAC system 4 is located may be unoccupied for an extended period of time. In other cases, the third operating mode may correspond to a sleep mode wherein the building occupants are either asleep or inactive for a period of time. These are just some examples. It will be understood that the processor 64 may be capable of operating in additional modes as necessary or desired. The number of operating modes and the operating parameter settings associated with each of the operating modes may be established locally through a local user interface, and/or through an external web service and delivered to the HVAC controller via the second network 58 where they may be stored in the memory 72 for reference by the processor 64.

In some cases, the processor 64 may operate according to one or more predetermined operating parameter settings associated with a user profile for an individual user. The user profile may be stored in the memory 72 of the HVAC controller 18 and/or may be hosted by an external web service and stored on an external web server. The user profile may include one or more user-selected settings for one or more operating modes that may be designated by the user. For example, the processor 64 may operate according to a first operating mode having a first temperature set point associated with a first user profile, a second operating mode having a second temperature set point associated with the first user profile, a third operating mode having a third temperature set point associated with the first user profile, and/or the like. In some cases, the first operating mode may correspond to an occupied mode, the second operating mode may correspond to an unoccupied mode, and the third operating mode may correspond to a vacation or extended away mode wherein the building or structure in which the HVAC system 4 is located may be unoccupied for an extended period of time. In some cases, multiple user profiles may be associated with the HVAC controller 18. In certain cases, where two or more user profiles are associated with the HVAC controller 18, the processor 64 may be programmed to include a set of rules for determining which individual user profile takes precedence for controlling the HVAC system when both user profiles are active.

Additionally, in some cases, when the HVAC controller 18 is in communication with a web server 66 such as shown in FIG. 2, the processor 64 may be programmed to periodically poll the web server 66, as discussed herein, according to an initial polling rate. The initial polling rate may be set by the manufacturer, installer or the like, and may be selected such that it utilizes a minimal amount of energy stored in the energy storage device 86 while at the same time maintains a satisfactory level of communication between the HVAC controller 18 and the web server 66 to achieve a desirable user experience.

In some cases, the processor 64 may be programmed to control the polling rate between the HVAC controller 18 and the web server 66 according to an available amount of power stored in the energy storage device 86. The processor 64 may be programmed to determine the amount of available energy stored by the energy storage device 85 and increase or decrease the communication rate between the HVAC controller 18 and the web server by increasing or decreasing the amount of time that occurs between when a first message is transmitted by the processor 64 to the server 66 via the communications block 60 and when a second message is transmitted by the processor 64 to the server 66 via the communications block 60. The amount of time that passes between when the first message is transmitted from the HVAC controller 18 to the server 66 and when the second message is transmitted may be referred to as the delay time. The delay time may range from less than half a second to greater than two hours depending upon the application and/or the amount of available power stored in the energy storage device 86 as determined by the processor 64. When the device is fully powered, the initial delay between two or more communications transmitted by the processor 64 to the web server 66 via the communications port may be relatively short. For example, the initial delay time between messages utilized by the processor 64 may be approximately five seconds. This is just an example. It will be generally understood that the initial delay time between messages transmitted by the processor 64 may be less than or greater than 5 seconds. In some cases, the initial delay time may be determined and programmed by the manufacturer. The processor 64 may change the delay time from its initial, default value dependent upon the amount of available power stored in the energy storage device 86. Changing the communication rate dependent upon the amount of available power stored in the energy storage device 86 may help conserve the available amount of power so that the HVAC controller 18 can continue to control the HVAC system for a longer time period. In some cases, the processor 64 may be configured to enter a sleep mode between communications transmitted to the web server 66 to conserve the available power stored in the energy storage device 86. When the processor 64 is in sleep mode, the communications block 60 may be placed in a low power state such that it consumes a minimal amount of energy, which may facilitate conservation of the available power stored in the energy storage device 86.

In some cases, the processor 64 may be configured to determine if the available amount of power is below a predetermined threshold. The predetermined threshold may be a default threshold value determined by the manufacturer, installer, or user. In one example, a user may select an energy conservation mode through a user interface 108 of the HVAC controller 18. Selection of an energy conservation mode may cause the processor 64 to utilize a different predetermined threshold value other than the default value set by the manufacturer. In some cases, the predetermined threshold value associated with an energy conservation mode may be greater than the default value. This is just one example. Regardless, if the processor 64 determines that the amount of power is below a predetermined threshold value, the processor 64 may be programmed to increase the delay between the transmissions of two or more communications to the web server 66. The delay may be increased relative to the delay that was utilized when the amount of available power was above the predetermined threshold or relative to a default delay. The amount of increase in the delay may be dependent on the amount of available power remaining in the energy storage device 86. In general, the less available power the greater the increase in the delay.

In some cases, upon determining a new delay time, which is dependent upon the amount of available power stored in the energy source, the processor 64 may be configured to transmit a message to the web server 66 that may include an indication of the delay time until a subsequent communication. For example, for a first amount of available power stored in the energy storage device 86, the processor 64 may communicate a first message to the web server 66 via the communications block 60 that is indicative of a first delay time until a subsequent communication time, and for a second amount of available power stored in the energy storage device 86, the processor 64 may communicate a second message to the web server 66 via the communications block 60 that is indicative of a second delay time until a subsequent communication time. In some cases, the first available amount of power may be greater than the second available amount of power, and the first delay time may be less than the second delay time. In one example, the first delay time may be less than about ten seconds and the second delay time may be greater than about thirty seconds. In other instances, the first delay time may be less than about ten seconds and the second delay time may be greater than about ten minutes. In still other examples: the first delay time may be less than about ten seconds and the second delay time may be less than twenty seconds; the first delay time may be less than about twenty seconds and the second delay time may be less than about forty five seconds; the first delay time may be less than about forty-five seconds and the second delay time may be less than about ten minutes; and the first delay time may be less than about forty-five seconds and the second delay time may be greater than about ten minutes up to about two hours. These are just some examples.

The processor 64 may be programmed such that it is fully functional when full power is available from the energy storage device 86. For example, when full power is available from the energy storage device 86, the processor 64 may be configured to receive and make temperature set point changes, humidity set point changes, schedule changes, start and end time changes, window frost protection setting changes, operating mode changes, and/or the like. In addition, the processor 64 may be able to receive and execute firmware and software updates including, for example, a firmware upgrade.

When less than full power is available from the energy storage device 86, the functionality of the processor 64 may be limited and/or certain actions may be prohibited. For example, when the amount of available power is determined by the processor 64 to be below a first predetermined threshold indicating that the HVAC controller is not fully charged, then only select functions may be carried out by the processor 64. In some cases, the processor 64 may be programmed to execute selected functions and/or prohibit certain actions when the amount of available power stored in the energy storage device 86 is determined to be less than about 75% of the full available power. For example, in some instances, firmware and/or software updates may be prohibited by the processor 64, but the processor 64 may still permit temperature set point changes, humidity set point changes, schedule changes, start and end time changes, window frost protection setting changes, operating mode changes, and/or the like. Additionally, the delay time between when a first message is transmitted to the web server via the communications block 60 and when a second message is transmitted may be increased by at least 50% and up to about 500% or more. In one example, the delay between transmission of a first message and a second message may be increased from about 5 seconds to about 20 seconds. This is just one example.

In other cases, when the amount of available power stored in the energy storage device 86 is determined to be less than a second predetermine threshold and is indicative of low power availability, then the processor 64 may be limited to executing simple, basic functions, may delay some functions, and may prohibit other functions. For example, when the amount of available power stored in the energy storage device is determined to be less than about 40% of the full available power, then the processor 64 may be unable to send and/or receive data to and from the web server, update an operating schedule, and/or change an operating mode. Firmware updates and/or software upgrades may be prohibited. The processor 64 may permit a temperature set point and/or humidity setpoint to be changed; however, the processor 64 may initiate a delay between when the set point change is accepted and when it is actually implemented at the HVAC controller 18. Additionally, the delay time between when a first message is transmitted to the web server via the communications block 60 and when a second message is transmitted may be increased by at least 50% and up to about 500% or more. In one example, the delay time between transmission of a first message and a second message may be increased from about 20 seconds to about 45 seconds. This is just one example.

In still yet other cases, when the amount of available power stored in the energy storage device 86 is determined to be less than a third predetermined threshold and is indicative of critically low available power, then very limited functions may be permitted by the processor 64. In instances, wherein the amount of available power stored in the energy storage device 86 is determined to be less about 25% of the full available power, the processor 64 may be configured to transmit a message to the web server 66 via the communications block 60 that indicates when the next message from the HVAC controller 18 may be expected. For example, in one instance, the processor 64 may transmit a message indicating that power at the HVAC controller 18 is critically low and that transmission of a subsequent message may occur in approximately one hour. In other instances, the processor 64 may transmit a message indicating that power at the HVAC controller 18 is critically low and that transmission of a subsequent message may occur in approximately two hours, four hours, six hours, and/or the like. In some cases, the processor 64 may be further programmed to display a message to the user via the user interface 108 that notifies the user that the power in the controller 18 is critically low. In other cases, the server 66 may be configured transmit a message notifying the user that the power is critically low via SMS text message or email message. In addition, the processor 64 may be programmed increase the delay time from the previous delay time to at least one hour and enter a sleep mode.

Figure 5:
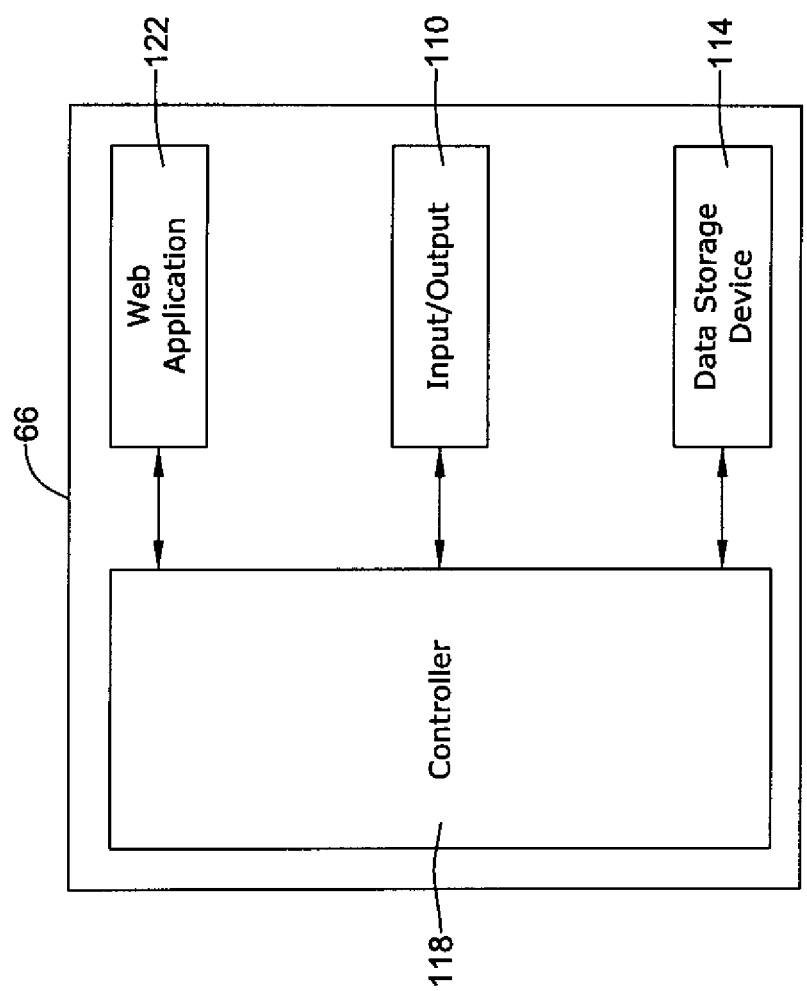
FIG. 5 is a schematic block diagram of an illustrative web server.

FIG. 5 is a schematic view of an illustrative server 66 that may be in communication with the HVAC controller 18 over a network, as described herein. The server 66 may be a dedicated web server 66 such as, for example, Honeywell's TOTAL CONNECT™ web server that provides a web service in which both the HVAC controller 18 and the user's remote device 62 may be enrolled. The server 66 may be coupled to the HVAC controller 18 over the second network 58 via a gateway and/or via a local area network located within the user's home such as described above (see, for example, FIG. 2). Additionally, the server 66 may be accessed by a user over the second network 58 using a remote device 62.

As shown in FIG. 5, the server 66 may include at least one input/output port 110 for sending and/or receiving data over second network 58 to and from the HVAC controller 18 and/or the user's remote device 62. The server 66 may also include a data storage device 114, and a controller 118 coupled to the input output port 110 and the data storage device 114. In some cases, the controller 118 may be configured to implement a web application 122 for serving up one or more web pages over the second network 58 via the input/output port 110. The one or more web pages may be accessed and viewed by a user through the user interface of any number of internet capable or WiFi-enabled remote devices such as, for example, a user's smart phone or tablet computer using a standard web browser. In some cases, the one or more web pages may provide a virtual user interface 108 for controlling the HVAC controller 18. Through the one or more web pages forming the virtual user interface 108, a user may enter or change various HVAC operating parameters including, but not limited, to temperature set points, humidity set points, starting times, ending times, schedule times, diagnostic limits, and/or the like, as well as respond to one or more alerts. While web pages are used as one example, it is contemplated that the server 66 may interact with a user via an application program running on the user's remote device 62.

In some cases, the server 66 may facilitate communication between a user's remote device 62 and the HVAC controller 18 by translating input from the user's remote device 62 to the HVAC controller 18. For example, a user may make a change to the HVAC controller 18 through the user interface provided by an app executed on their remote device 62. This change is then transmitted from the user's remote device 62 to the web server 66. The web server 66 may then send a message to the HVAC controller 18. Similarly, if a change to the HVAC controller 18 is made at the HVAC controller, a message indicating the change may be transmitted from the HVAC controller 18 to the server 66, and then the server 66 may send a message to the user's remote device where the change may be reflected by an app executed on the user's remote device.

As discussed herein, in some cases, the HVAC controller 18 may be programmed to periodically poll the external web server 66 via the second network 58. The rate at which the HVAC controller 18 polls the external web server 66 may control, at least in part, the overall communication rate between the HVAC controller 18, the web server 66, and a user's remote device 62. Typically, a faster polling rate may be expected to produce lower message latencies which may be desirable when the user is located in close proximity to the HVAC controller 18 because the user may observe the effect of their interaction with a minimal amount of waiting time. If the message latency is too slow, the user may become concerned that communication between the web server 66, the HVAC controller 18 and/or the user's remote device has been disrupted. Because a faster polling rate may use a greater amount of energy, in some cases, the polling rate may be dependent upon the amount of available energy at the HVAC controller 18.

In some cases, the server 66 may receive at least one message from the HVAC controller 18 that is related to the available amount of power stored in the energy storage device 86 of the HVAC controller 18 as determined by the processor 64. In some cases, as discussed herein, at least one message may indicate a measure related to the delay time until a subsequent message may be expected to be transmitted by the HVAC controller 18 to the server 66. Upon receiving at least one message indicating a measure related to the delay time, the controller 118 may be programmed to determine a power status of the HVAC controller 18 based on the measure related to the delay time include in the message. For example, in one instance, the controller 118 may be configured to determine that the HVAC controller 18 is no longer fully powered when the delay time indicated by the message received from the HVAC controller 18 is greater than a first predetermined threshold. In another instance, the controller 118 may be configured to determine that the HVAC controller 18 has a low power status when the delay time indicated by the message received from the HVAC controller 18 is greater than a second predetermined threshold. In yet another instance, the controller 118 may determine that the HVAC controller 18 has a critically lower power status when the delay time indicated by the message received from the HVAC controller 18 is greater than a third predetermined threshold. The message may include an actual delay time (e.g. 1 minute), or may include a parameter (e.g. power status) that the server 66 then translates into an actual delay time. Because the server 66 is informed by the HVAC controller 18 of a communication delay, the server 66 will not report a disruption in communication or a communication error when the HVAC controller 18 enters an extended sleep period. This may eliminate false reporting of a communication error.

In other cases, the server 66 may be configured to periodically poll the HVAC controller 18 located within the building via the second network 58. The controller 118 may be programmed to control the communication rate based, at least in part, on the amount of available power stored in the energy storage device of the HVAC controller 18. For example, the controller 118 may be configured to change a communication rate between the HVAC controller 18 and the server 66 in response to receiving a message from the HVAC controller 18 that indicates that the HVAC controller 18 has a lower power status. For example, as discussed herein, if a message received from the HVAC controller 18 in response to a poll from the server 66 indicates that the HVAC controller has a lower power status, then the controller 118 may be programmed to change the delay between successive transmission of messages during subsequent communication between the HVAC controller 18 and the server 66. In many cases, the controller 118 may increase the delay time between successive messages transmitted between the HVAC controller 18 and the server 66. For example, in one instance, the controller 118 may be configured to increase the delay time between two or messages transmitted between the HVAC controller 18 and the server 66 from a first delay time to a second delay time in response to receiving a message from the HVAC controller 18 indicating that the power status of the HVAC controller 18 is less than 100 percent. The second delay time may be greater than the first delay time. In another instance, the controller 118 may be configured to increase the delay time between two or messages transmitted between the HVAC controller 18 and the server 66 from the second delay time to a third delay time in response to receiving a message from the HVAC controller 18 indicating that the HVAC controller 18 has a low power status. The third delay time may be greater than the second delay time. In yet another instance, the controller 118 may be configured to increase the delay time between two or messages transmitted between the HVAC controller 18 and the server 66 from the third delay time to a fourth delay time in response to receiving a message from the HVAC controller 18 indicating that the HVAC controller 18 has a critically low power status.

In some cases, the controller 118 may be further programmed to buffer one or more messages to be transmitted from the server 66 to the HVAC controller 18 until the next subsequent communication time based on the delay time. When the next message is received from the HVAC controller 18, the controller 118 may transmit the buffered messages to the HVAC controller 18 over the second network 58 via the input/output port 110 in a rapid communication burst. The one or more buffered messages transmitted from the controller 118 to the HVAC controller 18 may include temperature set point changes, humidity set point changes, schedule changes, start and end time changes, window frost protection setting changes, operating mode changes, and/or the like. In some cases, these changes may be reflective of changes made by a user via a user interface 108 provided at the user's remote device 62 or via one or more web pages served up the by the server 66. Additionally, the one or more buffered messages may include firmware and/or software upgrades. As discussed herein, whether or not the HVAC controller 18 is able to implement the changes included in the one or more buffered messages transmitted by the server 66 may be dependent on the amount of available power stored in the energy storage device 86 of the HVAC controller 18. The HVAC controller 18 may also buffer messages that are to be transmitted to the server 66. For example, if a user changes a set point at the local user interface of the HVAC controller, this change may be buffered until the next communication time. Also, any alerts or other information that should be transmitted to the server 66 may be buffered by the HVAC controller. When the next communication time arrives, the HVAC controller may transmit the buffered messages to the server 66 in a rapid communication burst.

Additionally, the controller 118 of the server 66 may be further configured to transmit a message to a user indicative of the power status of the HVAC controller 18 in response to determining that the HVAC controller 18 has a lower power status based on the delay time indicated by the message received from the HVAC controller 18 or upon receiving a message indicative of the lower power status of the HVAC controller 18. In some cases, the controller 118 may be programmed to transmit a user message indicating the lower power status of the HVAC controller 18 over the second network 58 via the input/output port 110 to the user's remote device 62. In some cases, the user message may be an alert that alerts the user to the low power status of the HVAC controller 18 and/or notifies the user as to a possible service disruption between the HVAC controller 18 and the server 66. The message transmitted by the controller 118 may include a command which may cause the user's remote device 62 to display the user message on the display of the user interface of the user's remote device indicating the lower power status of the HVAC controller 18. In some cases, the user message indicative of the lower power status of the HVAC controller 18 may be displayed by an app executed by the user's remote device 62. In other cases, the user message may be transmitted as an SMS text message or an email message. An SMS text message transmitted by the controller 118 may be received by the user's remote device 62 and displayed on the display of the user interface of the user's remote device by the text messaging application program executed by the user's remote device 62. An email message transmitted by the controller 118 may be received at the user's email address that is associated with the user's account or profile on the web service (e.g. Honeywell's TOTAL CONNECT™ web service). The email from the controller 118 may be accessed and displayed on the display of the user interface of the remote device 62 by any number of email services that may be accessed using a web browser provided on the user's remote device. Additionally, the user message transmitted by the controller 118 may be displayed on the display of the user interface 108 located at the HVAC controller 18.

FIGS. 6-9 are illustrative screens including a user message that may be displayed to a user via a user interface 108 provided by an app executed by a user's remote device 62 or by one or more web pages that may be served up over the network via the server 66. In some cases, similar screens may be displayed on the display of the local user interface provided at the HVAC controller 18.

Figure 6:
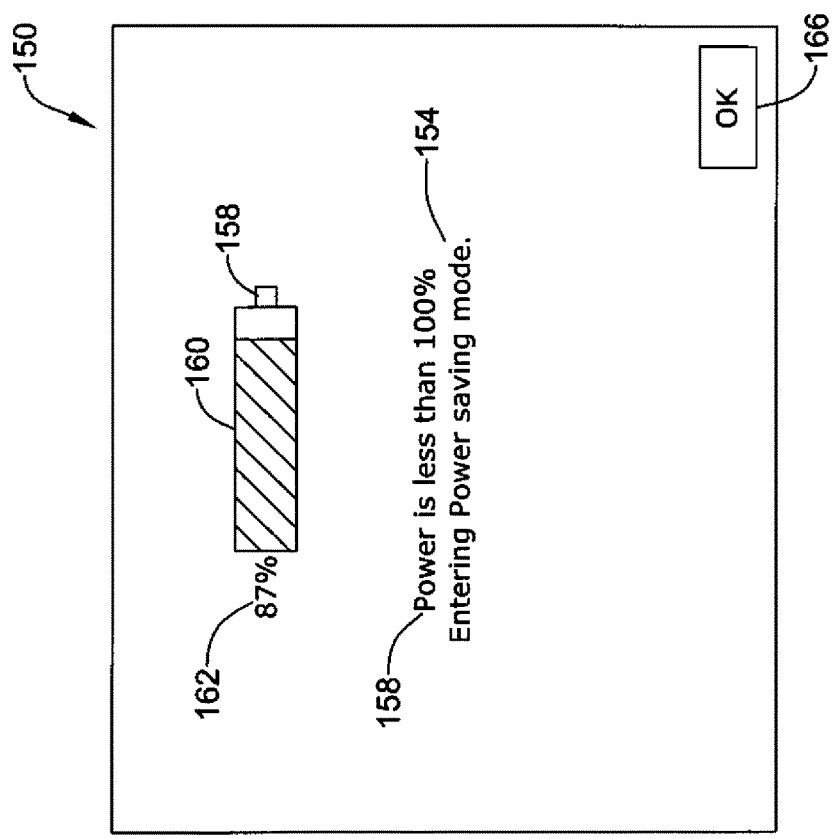
FIGS. 6-9 provide examples of illustrative screens that may be displayed to a user via a user interface.

Screen 150, shown in FIG. 6, includes an illustrative example of a first user message 154 that may be displayed on the display of the user interface of the HVAC controller 18 and/or a user's remote device 62 upon determining that the HVAC controller 18 has a lower power status. For example, as discussed herein, the controller 118 may determine that the amount of available power stored in the energy storage device 86 at the HVAC controller 18 is less than 100 percent based on the delay time indicated by the message received from the HVAC controller 18. The first user message 154 may include an indication of the power status of the HVAC controller 18. In some cases, the power status indication may be provided as a short text string 156 describing the power status of the HVAC controller 18 (e.g. power is less than 100%, low power, medium power, power critical, etc.). The user message 154 also may include additional information about the lower power status. For example, in some cases, the additional information may describe an action taken by the HVAC controller 18 in response to the lower power status. In other cases, a battery status indicator 158 depicting a battery 160 representing the amount of available power may be displayed. The battery status indicator 158 may include an indication 162 of the percentage of power remaining in the energy storage device 86. As shown in FIG. 6, the indication 162 of the percentage of remaining available power stored in the energy storage device 86 may be displayed adjacent to depiction of the battery 160. Additionally, in some cases, the battery status indicator 158 may change colors from green, to yellow, to orange, to red to visually indicate to the user the power status of the HVAC controller 18. The user may acknowledge the user message 154 by selecting an okay button 166 or other similar button that may displayed on the display of the user interface adjacent to the user message 154.

Figure 7:
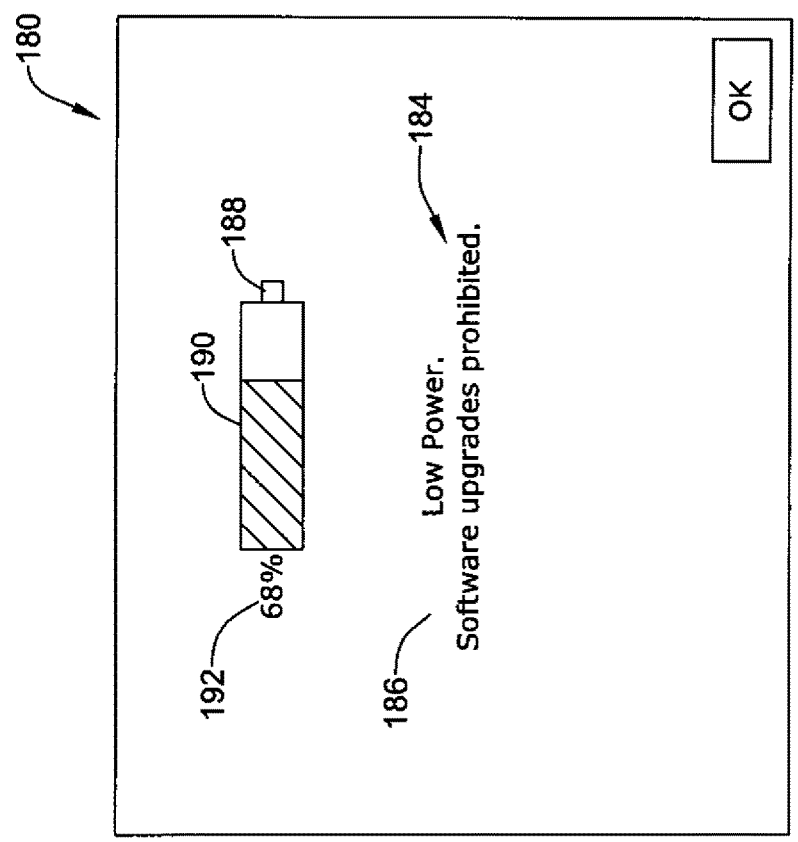

Screen 180, shown in FIG. 7, includes an illustrative example of a second user message 184 that may be displayed on the display of the user interface of the HVAC controller 18 and/or user's remote device 62 upon determining that the HVAC controller 18 has a low power status. For example, as discussed herein, the controller 118 may determine that the amount of available power stored in the energy storage device 86 at the HVAC controller 18 is low based on the delay time indicated by the message received from the HVAC controller 18. The second user message 184 may include an indication of the low power status of the HVAC controller 18. In some cases, the low power status indication may be provided as a short text string 186 describing the power status of the HVAC controller 18 (e.g. low power). The user message 184 also may include additional information about the low power status. For example, in some cases, the additional information may indicate to the user that only selected functions may be carried out the HVAC controller 18 and/or which functions may be prohibited due to the low power status of the HVAC controller 18. Additionally, in other cases, a battery status indicator 188 depicting a battery 190 representing the amount of available power may be displayed in addition to or instead of the user message 184. The battery status indicator 188 may include an indication 192 of the percentage of power remaining in the energy storage device 86. As shown in FIG. 7, the indication 192 of the percentage of remaining available power stored in the energy storage device 86 may be displayed adjacent to depiction of the battery 190. Additionally, in some cases, the battery status indicator 188 may change colors from green, to yellow, to orange, to red to visually indicate to the user the power status of the HVAC controller 18. In this example, the battery status indicator 158 may be orange to visually indicate the low power status of the HVAC controller 18. The user may acknowledge the user message 184 by selecting an okay button 196 or other similar button that may displayed on the display of the user interface adjacent to the user message 184.

Figure 8:
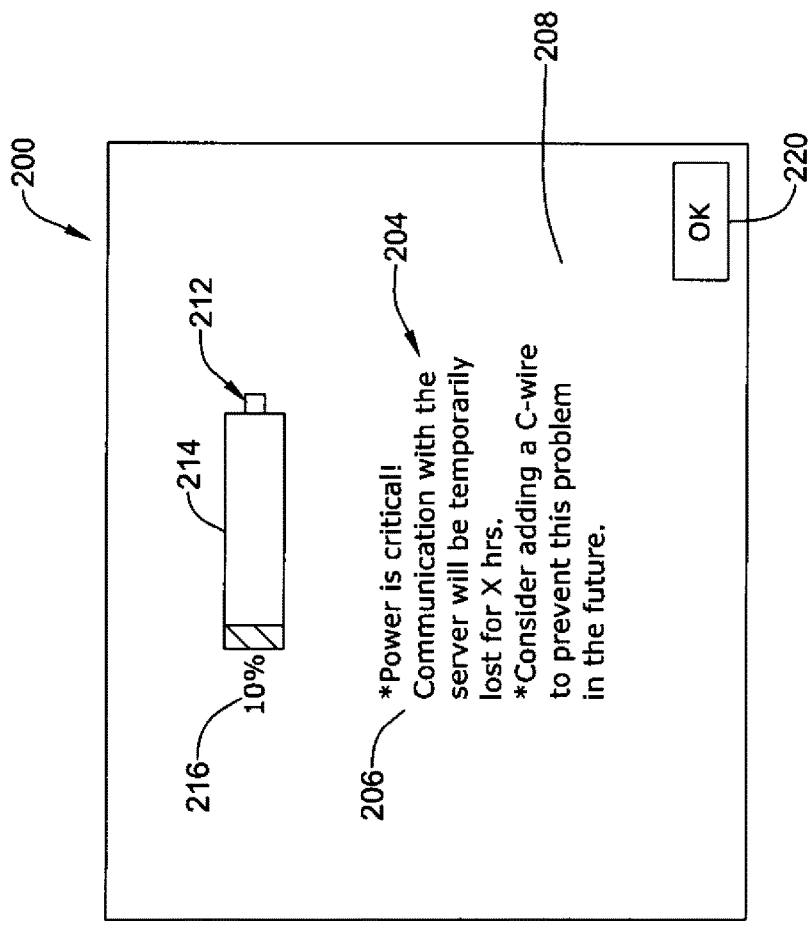

Screen 200, shown in FIG. 8, includes an illustrative example of a third user message 204 that may be displayed on the display of the user interface of the HVAC controller 18 and/or the user's remote device upon determining that the HVAC controller 18 has a critically low power status. For example, as discussed herein, the controller 118 may determine that the amount of available power stored in the energy storage device 86 at the HVAC controller 18 is critically low based on the delay time indicated by the message received from the HVAC controller 18. The second user message 204 may include an indication of the critically low power status of the HVAC controller 18. In some cases, the power status indication may be provided as a short text string 206 describing the power status of the HVAC controller 18 (e.g. power is critical or critically low power). The user message 204 also may include additional information about the low power status. For example, in some cases, the additional information may indicate to the user that only selected functions may be carried out the HVAC controller 18 and/or which functions may be prohibited based due to the low power status of the HVAC controller 18. In other cases, the user message 204 may include a user prompt 208, prompting the user to take a desired action to address the low power state of the HVAC controller 18. For example, the user prompt 208 may prompt the user to add a common wire (C-wire) to the wiring configuration for the HVAC system 4 to supply power to the HVAC controller 18. In other cases, the user prompt 208 may prompt the user to change their battery or temporarily operate the fan to power the HVAC controller 18 in order to charge the energy storage device 86. These are just cases. In addition to the user message 204 and/or user prompt 208, a battery status indicator 212 depicting a battery 214 representing the amount of available power may be displayed. The battery status indicator 212 may include an indication 216 of the percentage of power remaining in the energy storage device 86. As shown in FIG. 8, the indication 216 of the percentage of remaining available power stored in the energy storage device 86 may be displayed adjacent to depiction of the battery 214. Additionally, in some cases, the battery status indicator 212 may change colors from green, to yellow, to orange, to red to visually indicate to the user the power status of the HVAC controller 18. In this example, the battery status indicator 212 may be red to visually indicate the low power status of the HVAC controller 18. The user may acknowledge the user message 204 by selecting an okay button 220 or other similar button that may displayed on the display of the user interface adjacent to the user message 204.

Figure 9:
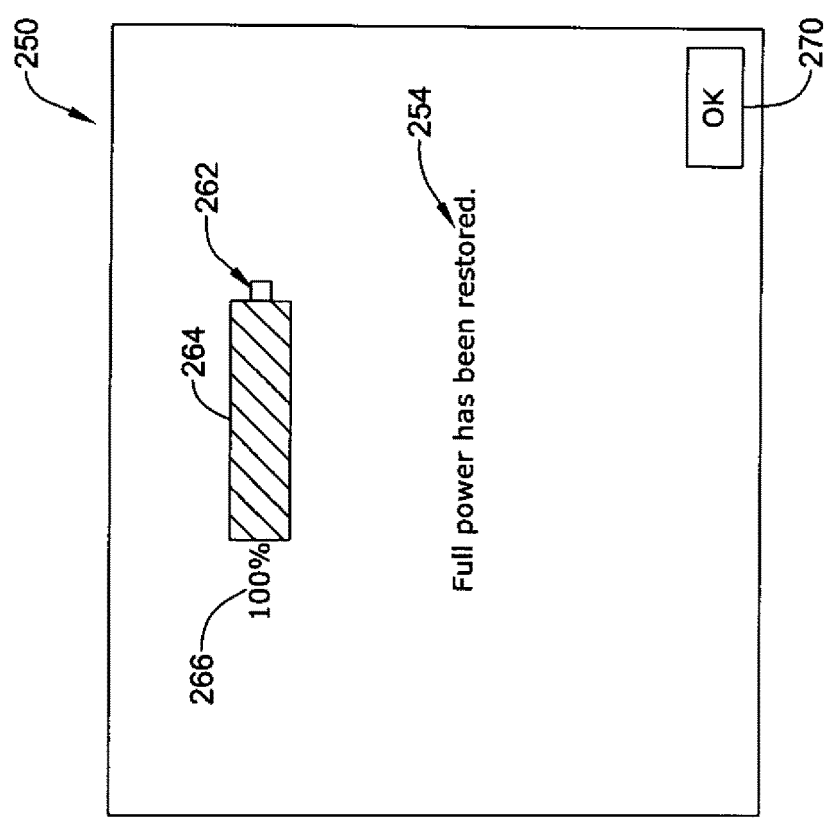

FIG. 9 shows a screen 250 including an example of an illustrative user message 254 that may be displayed to the user on the display of a user interface of the HVAC controller 18 and/or user's remote device 62 when the controller 118 determines that the HVAC controller 18 has been restored to full power. The controller 118 may determine that HVAC controller 18 has been restored to full power based on a decrease in the delay time indicated by a message received from the HVAC controller 18. The user message 254 may include an indication of the full power status of the HVAC controller 18. In some cases, the power status indication may be provided as a short text string 206 describing the power status of the HVAC controller 18 (e.g. full power or full power has been restored). In addition to the user message 254, a battery status indicator 262 depicting a battery 264 representing the amount of available power may be displayed. The battery status indicator 262 may include an indication 266 of the percentage of power available in the energy storage device 86. As shown in FIG. 9, the indication 266 of the percentage of remaining available power stored in the energy storage device 86 may be displayed adjacent to depiction of the battery 264. Additionally, in some cases, the battery status indicator 212 may be green to visually indicate to the user the fully powered status of the HVAC controller 18. The user may acknowledge the user message 254 by selecting an okay button 270 or other similar button that may displayed on the display of the user interface 108.

Having thus described several illustrative embodiments of the present disclosure, those of skill in the art will readily appreciate that yet other embodiments may be made and used within the scope of the claims hereto attached. Numerous advantages of the disclosure covered by this document have been set forth in the foregoing description. It will be understood, however, that this disclosure is, in many respect, only illustrative. Changes may be made in details, particularly in matters of shape, size, and arrangement of parts without exceeding the scope of the disclosure. The disclosure's scope is, of course, defined in the language in which the appended claims are expressed.

What is claimed is:

1. A system comprising a building controller in communication with a server over a network, the system comprising:
a building controller located within a building comprising:
a command module for sending one or more control signals to one or more building components;
a communications module for sending and/or receiving messages over the network;
a power module for powering at least part of the building controller;
a controller operatively coupled to the command module, the communications module, and the power module, the controller is configured to determine an available amount of power stored in the power module and is further configured to communicate, via the communications module, one or more messages that is related to the determined available amount of power stored in the power module;
the controller is further configured to perform one or more of:
communicate at a plurality of communication times via the communications module, wherein there is a delay between each of the plurality of communication times, and wherein the delay is based, at least in part, on the determined available power stored in the power module; and
execute a plurality of functions, wherein the controller selectively prohibits certain of the plurality of functions based, at least in part, on the determined available power stored in the power module;
a server in communication with the building controller over the network, the server configured to receive the one or more messages that is related to the determined available amount of power stored in the power module of the building controller, the server further configured to transmit information to a mobile user device via the network, wherein the information notifies the user as to the power state of the building controller and prompts the user to take a specified action to address the available amount of power stored in the power module, wherein the specified action to address the available amount of power comprises one or more of:
adding a common wire (C-wire) to the building controller to directly supply power to the power module of the building controller; and
temporarily activating one or more of the building components to facilitate a power stealing block of the power module in charging an energy storage device of the power module of the building controller.

2. The system of claim 1, wherein the information transmitted to the mobile device from the server further includes an expected delay time before a next communication time with the building controller.

3. A method of operating a building control system, wherein a building controller of the building control system includes an energy storage device for powering at least part of the building controller, and a communications port for sending and/or receiving messages to an external server via a network at successive communication times separated by a delay, the method comprising:
determining an available amount of power stored in the energy storage device of the building controller;
determining when the available amount of power is below a first predetermined threshold and is indicative of a reduced power state of the energy storage device, and when so, increasing the delay between successive communication times relative to when the available amount of power is above the first predetermined threshold;
reducing the functionality of the building controller when the available amount of power is below a second predetermined threshold;
sending a message to the external service that indicates a measure of the available amount of power stored in the energy storage device; and
sending a message from the external service to a user's mobile device that prompts the user to take a specified action to address the available amount of power stored in the energy storage device when the available amount of power is indicative of a reduced power state of the energy storage device, wherein the specified action to address the available amount of power comprises one or more of:
adding a common wire (C-wire) to the building controller to supply power to the building controller; and
temporarily activating one or more building components of the building control system to facilitate a power stealing block in charging the energy storage device of the building controller.

4. The method of claim 3, wherein the first predetermined threshold is different from the second predetermined threshold.

* * * * *